United States Patent [19]
Peach et al.
[11] 3,814,837
[45] June 4, 1974

[54] CONNECTOR ADAPTER DEVICE

[75] Inventors: John B. Peach; William E. McEachnie, both of Orlando, Fla.

[73] Assignee: The United States of America as represented by the Secretary of the Army, Washington, D.C.

[22] Filed: Oct. 24, 1972

[21] Appl. No.: 300,043

[52] U.S. Cl. ....... 174/88 R, 317/101 CC, 339/17 R, 339/60 R, 339/275 B
[51] Int. Cl. ........................................... H05k 1/04
[58] Field of Search ........ 339/17 R, 17 C, 17 E, 60, 339/61, 18, 59, 195, 94, 93, 19, 17 N, 17 D, 17 LM, 14 R, 177, 176, 198, 275, 63, 17 L, 17 M, 17 LC, 17 F, 17 D, 193 P

[56] References Cited

UNITED STATES PATENTS

| | | | |
|---|---|---|---|
| 2,960,605 | 11/1960 | Montz | 339/193 VS X |
| 3,031,738 | 5/1962 | Pavlovitz | 339/17 C X |
| 3,076,165 | 1/1963 | Weyrich | 339/17 C |
| 3,271,726 | 6/1966 | Pfendler | 339/49 R |
| 3,551,874 | 12/1970 | Volinskie | 339/177 R X |
| 3,580,985 | 5/1971 | Rothfoss et al. | 174/68.5 |
| 3,594,696 | 7/1971 | Witek, Jr. | 339/60 M |

OTHER PUBLICATIONS

IBM Technical Disclosure Bulletin, Vol. 5, No. 9, Feb. 1963, "Flexible Cable Contacts," H. P. Byrnes.

*Primary Examiner*—Bobby R. Gay
*Assistant Examiner*—Terrell P. Lewis
*Attorney, Agent, or Firm*—Lawrence A. Neureither; Leonard Flank; Charles R. Carter

[57] ABSTRACT

A device for use in connecting electrical components in missile circuits. The device includes a card having a printed electrical circuit thereon and wires to connect the circuit to connector pins in the device. Thus electrical continuity is provided from an electrical source to an unlimited number of connector pins.

1 Claim, 2 Drawing Figures

CONNECTOR ADAPTER DEVICE

BACKGROUND OF THE INVENTION

This invention relates to the field of connectors. In conventional connector designs where a number of common pins are connected on a conductor, individual stranded wire jumpers from pin to pin are required to obtain the desired connection. This condition presents a problem of undue strain being placed on the seal by reason that a large number of wires passes through the seal. The strain on the seal often causes fracture of the seal with the result that pins are pulled from the seal when the connector is disengaged for circuit changes or for testing purposes. An additional problem inherent with conventional designs is that of extensive buildup of wire at the rear of the connector.

SUMMARY OF THE INVENTION

This invention provides a solution to the above stated problems by using an adapter for engagement with the connector seal. The adapter includes etched circuitry on a printed wiring card that is then connected to an incoming wire and to the connector pins.

This invention may be better understood from the following detailed description taken in conjunction with the accompanying drawing.

DESCRIPTION OF THE PREFERRED EMBODIMENT

Figure 1:
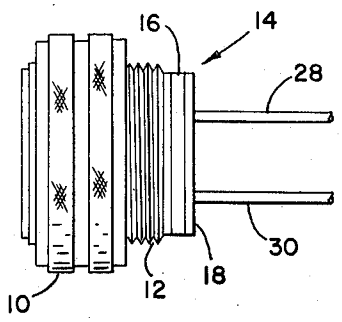
FIG. 1 is a side view of a device with an adapter attached to the connector.
Figure 2:
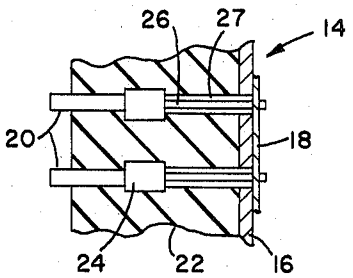
FIG. 2 is an enlarged view of the adapter connected to the seal of the connector.

In FIG. 1 reference numeral 10 identifies a connector having a threaded connection 12 and a connector adapter 14, which is more clearly shown in FIG. 2. The adapter is a round printed wiring board 16 made of a copper clad plastic sheet. Portions of the copper sheet are etched away to leave copper conductors 18 in consecutive order as predetermined by the circuitry desired. Connector pins 20 are fitted into a rubber grommet seal 22 and project therefrom and are crimp connected at 24 to solid wire leads 26. These leads extend through openings 27 and are solder connected to the wiring board 16. This soldering connection firmly holds the board 16 against seal 22. Conductor wire 28 passes through an opening provided in the card and is connected to one of the pins 20. The other conductor wire 30 is connected to the wiring board 16. Thus this device provides electrical continuity from a source to an unlimited number of connector pins.

In use an adapter is placed over solid wires, that have been previously crimped into engagement with pins 20, and inserted into a connector. The adapter is then soldered to these wires to terminate the connections.

Through the use of a device as described above the quantity of wires that are placed in the pins and pass through the grommet seal are reduced by a minimum of 50 percent. This wire reduction is possible since only one solid wire extends to each pin whereas present designs require at least two wires per pin. Thus wire reduction eliminates grommet seal distortion or undue strain that leads to grommet seal fracture and pulled pins. The use of a printed wiring card reduces the extensive buildup of wire at the rear of the connector and further reduces the distortion on the connector strain relief.

We claim:

1. A device for providing electrical continuity from an electrical source to an unlimited number of connector pins, said device comprising: a rubber grommet seal having connector pins projecting therefrom; a printed wiring board having electrical circuitry thereon disposed against one surface of said seal; and solid wire leads connecting said pins to said board to provide electrical continuity therebetween, said leads being solder connected to said board and crimp connected to said connector pins.

* * * * *